Sept. 26, 1972          S. SIEGEL          3,694,235

DISPOSABLE FOOD-VENDING PACKAGE

Filed March 20, 1970          2 Sheets-Sheet 1

INVENTOR
SIDNEY SIEGEL
BY Karl F. Ross
ATTORNEY

Sept. 26, 1972  S. SIEGEL  3,694,235
DISPOSABLE FOOD-VENDING PACKAGE
Filed March 20, 1970  2 Sheets-Sheet 2

INVENTOR
SIDNEY SIEGEL
BY  Karl F. Ross
ATTORNEY

United States Patent Office 3,694,235
Patented Sept. 26, 1972

1

3,694,235
DISPOSABLE FOOD-VENDING PACKAGE
Sidney Siegel, 989 Schenectady Ave.,
Brooklyn, N.Y. 11203
Filed Mar. 20, 1970, Ser. No. 21,286
Int. Cl. B65b 29/02
U.S. Cl. 99—171 B    4 Claims

ABSTRACT OF THE DISCLOSURE

A disposable food-vending package for making coffee, tea, soup, or other comestible in which water or other liquid dissolves, extracts, irrigates or treats a liquid, solid or semi-solid foodstuff is disclosed having a hermetically sealed disposable and heatable receptacle or can holding in its upper portion a container with a premeasured charge of the fluid-activatable foodstuff. A riser leads up from the lower portion to the receptacle so that water can be conducted up into this receptacle when the can is heated. The sealed cover of the can may be partially opened to permit cooking of the package and pouring-off the finished food product, whereupon the receptacle or can may be discarded.

---

The present invention relates to a disposable food-vending package and more particularly, to a disposable coffee maker or like cooking unit for two ingredients which may be combined to form an edible foodstuff.

The preparation of good coffee requires that hot water be passed through fresh coffee grounds. This process can be carried out through several methods with such devices as percolators, so-called vacuum pot, drip pots, and filters. All such devices operate on the basic principle that the hot water remains in contact with the coffee grounds only for a certain amount of time to brew the finished coffee correctly.

Such devices all necessitate the painstaking measuring of the coffee charge, assembling the pot, filling this pot with water and heating the filled pot. Afterwards the extremely messy wet grounds must be disposed of and the often intricate pot must be disassembled and thoroughly scoured. It is necessary that the pot be completely clean for good coffee.

It is, therefore, an object of the present invention to provide an improved method of making coffee which overcomes the above disadvantages.

Another object is to provide a coffee maker which makes good coffee easily, without presenting the above-mentioned disadvantages.

A further object is to provide such a coffee maker, although the same principles are equally applicable to the making of cocoa, soup, tea, and the like which is inexpensive to manufacture and, therefore, can be made available at an attractive price to the consumer.

It is the general object of this invention to provide an improved disposable package for preparing and dispensing comestibles in which two ingredients are interacted under the influence of heat to prepare a flowable product.

I attain these objects with a food-vending package that is fully disposable and comprises a hermetically sealed can in the upper portion of which is a receptacle holding a premeasured charge of a foodstuff, e.g. coffee, tea, cocoa, soup extract, which is activatable by a fluid, usually water.

2

According to another feature of the present invention the upper and lower portions of the can are connected together by a pipe or other means for conducting hot water between these two portions or compartments. This pipe allows the can to be used as a disposable vacuum pot or percolator, depending on the type of receptacle provided.

The water can either be provided already packaged in the can, in which case means is provided to keep the water and the coffee grounds apart prior to use, or it can be added just before the whole can is put on the heat to make the coffee.

In accordance with a further feature of the invention a funnel having a pointed stem is pierced through the cover of the can and is used both to introduce water into the lower portion prior to cooking, and to pour off the finished coffee. To this end the stem of the funnel is provided with an annular boss which is adapted to engage under the can cover while its upper end is formed with a handle and a spout to facilitate lifting and pouring.

According to another feature of this invention there is provided an auxiliary clip, holder or stand which holds the can of finished coffee. In this case there is no need of a funnel arrangement as described above since the coffee may simply be poured out through an aperture formed in the can.

In each case, however, means is provided to form an aperture in the can. As mentioned above, this can be simply some instrument to pierce the can cover. In according to another feature of this invention, the cover is opened by such means as a simple pointed can opener or by means of so-called pull-top or snap-tab arrangement wherein a lug attached to the cover is pulled away to tear off a portion of this cover along a score line.

A food package according to the present invention allows coffee, tea, or other liquids to be prepared in an extremely simple manner: the container is simply opened, water is added in some cases, and heat is applied to its base. After use, the entire device is discarded to completely obviate any pot clean-up.

In general terms, therefore, the present invention comprises a fully sealed receptacle of heat-resistant material which directly contains at least one food ingredient adapted to be contacted with a second, liquid ingredient under the influence of heat. The receptacle comprises two portions which are physically separated from one another, one of which contains the first-mentioned ingredient whereas the other contains or is adapted to receive the liquid ingredient. The portions are so separated, constructed and arranged as to permit contact between the two ingredients only upon heating of the receptacle, whereupon the flowable product is found in the liquid compartment of the receptacle and may be dispensed for use. Preferably the receptacle is of the destructible type whereby, once opened, the receptacle has no further utility and cannot practically be reused. However, the present invention also contemplates reuse, in which case the inner parts of the receptacle may be exposed by a complete removal of the cover. Reference has been made herein to various material as constituting the receptacle and inner parts and it is to be noted that these materials have been named solely to provide a specific example of the best mode currently known to me for carrying the invention out in practice. There are, however, other materials, such as paper and fiber products which, with water in the receptacle, may withstand heat for a period sufficient to allow the water to boil and may then be discarded with less difficulty than aluminum cans. Similarly the inner parts of the passage may be constructed of synthetic resin materials as long as these materials are capable of withstanding the heat of boiling water.

The above and other objects, features, and advantages will become apparent from the following description, reference being made to the accompanying drawing in which.

Figure 1:
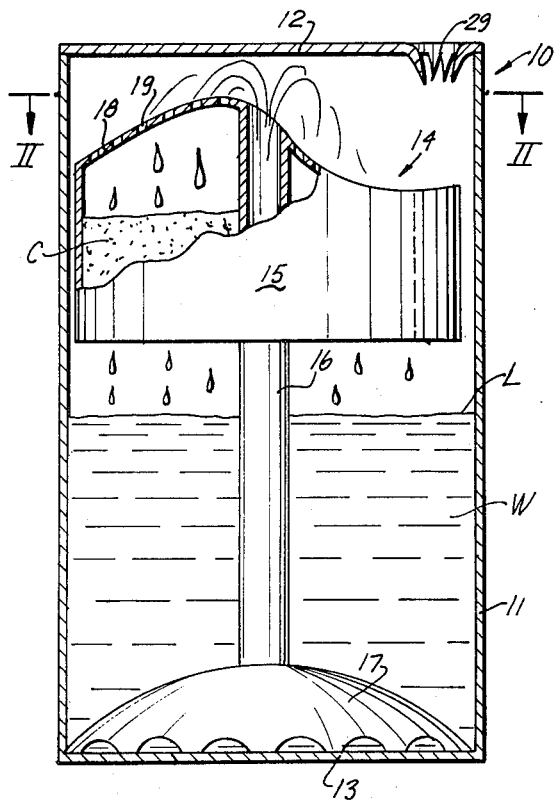
FIG. 1 is a vertical section through a coffee-maker according to the present invention.
Figure 2:
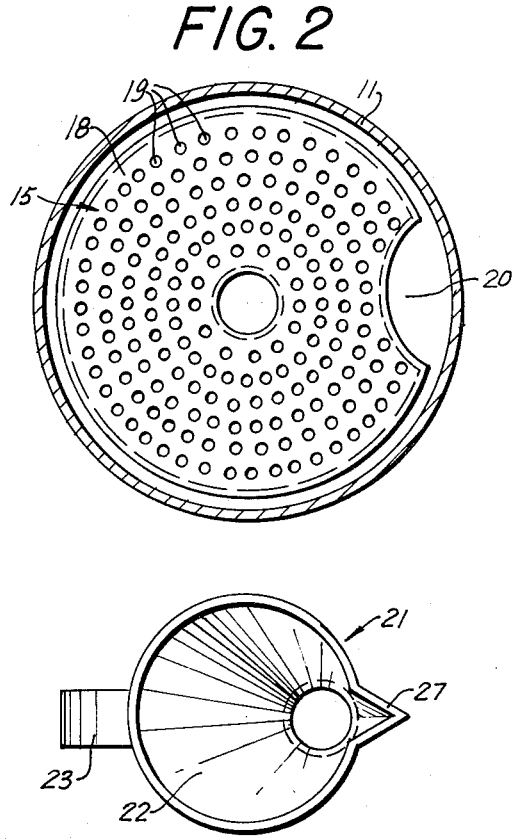
FIG. 2 is a section taken along line II—II of FIG. 1.

As shown in FIGS. 1 and 2, a disposable percolator 10 basically consists of a can 11 having a cover 12 and a base 13 defining a hermetically closed chamber in which the percolator works 14 are received or which may have all or part of the latter formed directly from the material of the can and unitary with the walls thereof. These works 14 comprise a basket 15 filled with a charge C of coffee and having a top 18 and bottom both formed with a multiplicity of small holes 19, a conduit or riser pipe 16 extending axially up from the lower portion to the upper portion of the can 11 completely through the basket 15, and a cup 17 on the lower end of the pipe 16 having a serrated edge, resting on the base 13 of the can 11.

Figure 3:
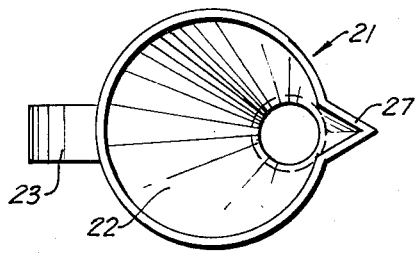
FIG. 3 is a top view of a funnel arrangement according to the present invention.
Figure 4:
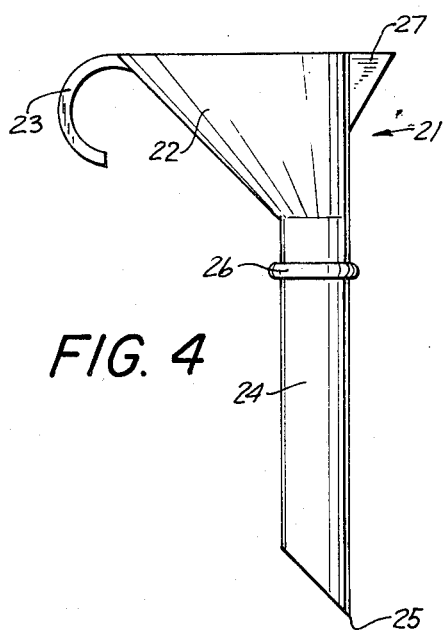
FIG. 4 is an elevational side view of the arrangement of FIG. 3.
Figure 5:
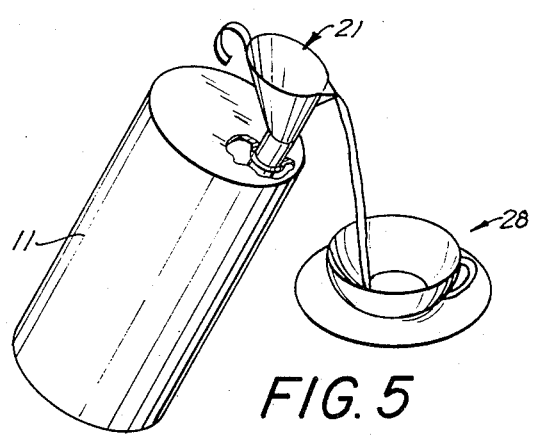
FIG. 5 is a perspective view showing the pot of FIGS. 1–4 in use.

FIGS. 3 and 4 show a funnel arrangement 21 which is usable with the percolator 10. This funnel 21 has an upper funnel portion 22 formed with a handle 23 and a spout 27; and a stem 24 formed with a point 25 at one end and an annular boss 26 near where it joins the upper funnel portion 22

In use, the funnel arrangement 21, which is made of steel, is punched through the cover 12 of the can 11 to form therein a hole 29. This cover 12 is provided with indicia marking the place where the hole 29 is to be pierced and the basket 15 is formed at its periphery with an axially extending notch 20 permitting passage of the funnel stem 24 past it. The stem 24 is pushed in until the boss 26 engages under the cover 12. Then a measured quality of water W (see FIG. 1) is poured into the mouth 22 of this funnel to pass down through the upright passage 20 and fill the percolator 10 up to level L. The entire package can then be placed on the heat so that, as in a conventional percolator, boiling water is driven up the pipe 16 by the gas-lift pumping action and flows down through the charge of coffee C which is held in the basket 15. After the coffee has percolated sufficiently, the entire package 10 is lifted off the heat by means of the handle 23 and poured from the spout 27 into a cup 28.

The can 11 is advantageously made of aluminum, for example, of the same gauge as a customary beer can. The percolator works 14 can, however, be of much lighter gauge metal, aluminum again being preferable. The interior of the cam 11, prior to opening, is at subatmospheric pressure, so that the coffee C in the basket 15 is vacuum packed and remains fresh.

Figure 7:
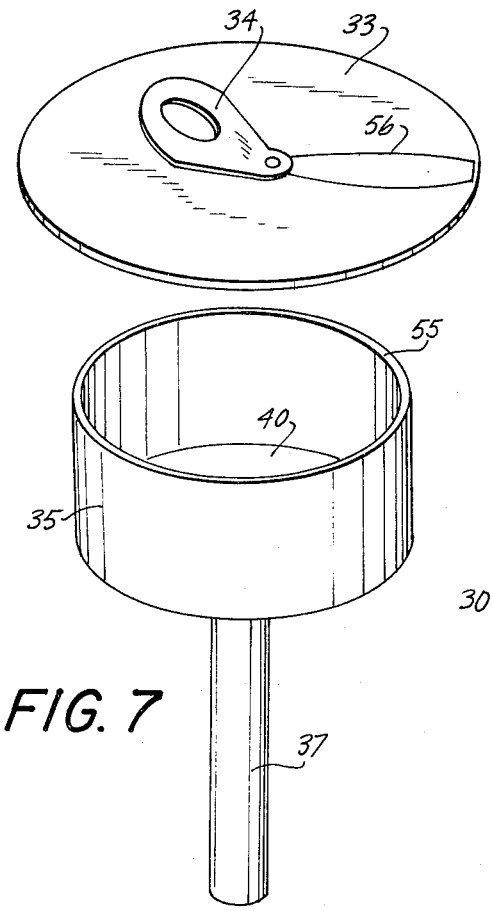
FIG. 7 is an exploded perspective view of a detail of FIG. 6.
Figure 6:
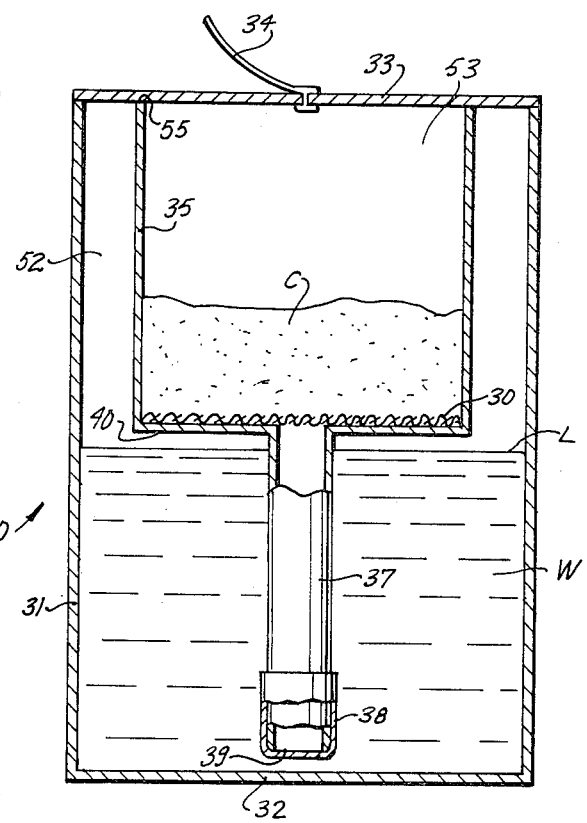
FIG. 6 is a view similar to FIG. 1 of an alternative embodiment of the present invention.

FIGS. 6 and 7 show a vacuum coffee pot 30 comprising a can 31 having a base 32 and a cover 33. The inner works include a receptacle 35 having a base 40 unitarily formed with a pipe 37. The lower end 39 of this pipe 37 is fitted with a cap 38 of a synthetic-resin material such as Saran polyester film which thermoplastically softens at around 180° F. and which imparts no offensive or recognizable taste to boiling water.

In the fabrication of such a package first a charge of coffee C is placed in the receptacle 35 with a gauze screen 36 overlying and attached to the base 40. Then the upper rim 55 of this basket 35, which is largely evacuated, is bonded to the cover 33 to form a closed compartment 53. Thereafter water W is filled into the can 31 up to level L, and the cover 33 peripherally bonded to the can 31 to form another compartment 52 which is once again largely evacuated to prevent rupturing of the film 38.

The cover 33 is provided with a so-called snap-top arrangement consisting of a lug 34 riveted near the center of this cover 33 and a score line 56 that defines a closed elongated region extending from around the rivet to the very edge of the cover 33.

Figure 8:
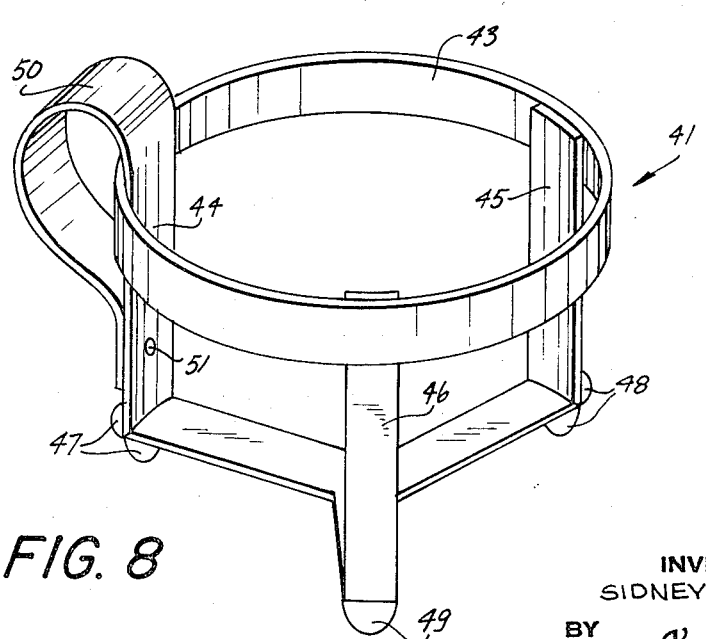
FIG. 8 is a pot stand usable with the pot of FIG. 6.

FIG. 8 shows a stand 41 for the pot of FIGS. 6 and 7 comprising a closed hoop 43 and three metal bands 44, 45, and 46 forming a base and provided with respective insulated feet 47, 48, and 49. The band 44 is bend back to form a handle 50 which is riveted at 51. This stand 41 is made of heat-resistant thermosetting synthetic resin and is dimensioned to grip the can 31 lightly.

The arrangement shown in FIGS. 6–8 is intended for areas where the local water is so laden with purifying chemicals, minerals or pollutants as to render the making of good coffee impossible, the water W in the can 31 can be clear spring water.

In order to make coffee with the pot of FIGS. 6–8 the lug 34 is bent up until a crack is heard and the vacuum of the compartment 53 is broken; for the moment, the lug 34 is pulled no further. The entire package 30 is then set on the heat and heated until a "gurgling" sound is emitted, signifying that vapor pressure has driven virtually all the water up through the pipe 37. The cap 38 on this pipe 37 will rupture as soon as it is heated to allow this passage of water up through the pipe. When the "gurgling" sound is heard, heating of the can 31 is terminated and the pressure differential created by slight cooling of the bottom draws the coffee down through the pipe 37 into the compartment 52. After several minutes the entire package can be placed in the stand 41 and the lug 34 pulled back to rip out the entire area circumscribed by the score line 56, thereby enabling the coffee to be poured out of the top of the chamber 52. Once all the coffee has been poured off, the entire package 30 may be discarded.

As in the embodiment of FIGS. 1–5, the package of FIGS. 6 and 7 advantageously made of aluminum since this type of construction is very inexpensive and eliminates the possibility that the coffee or water in the can may take on a bad taste.

The improvement described and illustrated is believed to admit of many modifications within the ability of persons skilled in the art, all such modifications being considered within the spirit and scope of the invention except as limited by the appended claims.

I claim:

1. A disposable food package comprising:
   a hermetically sealed rigid metal can having an upper portion, a lower portion, and a pierceable cover in all-around sealing engagement with said upper portion;
   a disposable perforated basket in said upper portion holding a premeasured charge of a foodstuff activatable by a hot fluid, said lower portion being sufficiently large to hold a quantity of said hot fluid sufficient to activate said foodstuff, said basket forming with said sealed can an upright passage through said upper portion past said basket for introduction of said fluid into said lower portion, said cover bearing an indication showing the location of said passage;
   means between said portions including an upright riser pipe for conducting hot fluid from said lower portion to said upper portion above said basket upon heating of said lower portion.

2. The package defined in claim 1 wherein said basket is carried on the upper end of said pipe, and wherein said means also includes a downwardly open cup at the lower end of said pipe.

3. The package defined in claim 2 wherein said basket is formed with an upright notch defining said passage, said indication on said cover being in line with said notch.

4. A disposable food package comprising:
  a hermetically sealed rigid metal cylindrical can having an upper portion, a lower portion, and a pierceable cover in all-around sealing engagement with said upper portion;
  an upright riser pipe in said can extending between said lower portion and said upper portion;
  a downwardly open cup in said lower portion carried on the lower end of said pipe; and
  a perforated basket carried on the upper end of said pipe and containing a premeasured charge of coffee, said basket being formed with an upright notch defining with said sealed can an upright passage in said upper portion past said basket, said pipe extending completely through said basket, said cover bearing indicia in line with said passage.

References Cited
UNITED STATES PATENTS

| | | | |
|---|---|---|---|
| 3,083,100 | 3/1963 | Baran | 99—77.1 |
| 3,199,682 | 8/1965 | Scholtz | 99—77.1 X |
| 3,208,370 | 9/1965 | Steriss | 99—77.1 UX |
| 2,218,285 | 10/1940 | Jellik, Jr. | 222—81 |
| 3,119,694 | 1/1964 | Gauld | 99—77.1 |
| 3,391,632 | 7/1968 | Colonna | 99—295 X |
| 494,206 | 3/1893 | Jones | 99—295 X |
| 3,088,631 | 5/1963 | Lien et al. | 222—81 |

FRANK W. LUTTER, Primary Examiner

S. L. WEINSTEIN, Assistant Examiner

U.S. Cl. X.R.

99—77.1, 171 H, 295; 206—.5, 46 F